United States Patent
Scarponi et al.

(10) Patent No.: US 10,174,630 B2
(45) Date of Patent: Jan. 8, 2019

(54) GAS TURBINE IN MECHANICAL DRIVE APPLICATIONS AND OPERATING METHODS

(71) Applicant: Nuovo Pignone Srl, Florence (IT)

(72) Inventors: Marco Scarponi, Florence (IT); Antonio Pelagotti, Florence (IT); Paolo Bianchi, Florence (IT); Lorenzo Naldi, Florence (IT); Giuliano Milani, Florence (IT); Claudio Antonini, Florence (IT); Graziano Dell'Anna, Florence (IT); Paolo Battagli, Florence (IT); Mirko Libraschi, Florence (IT); Annunzio Lazzari, Florence (IT); Damiano Agostini, Florence (IT)

(73) Assignee: Nuovo Pignone Srl, Florence (IT)

( * ) Notice: Subject to any disclaimer, the term of this patent is extended or adjusted under 35 U.S.C. 154(b) by 90 days.

(21) Appl. No.: 14/441,549

(22) PCT Filed: Nov. 7, 2013

(86) PCT No.: PCT/EP2013/073308
§ 371 (c)(1),
(2) Date: May 8, 2015

(87) PCT Pub. No.: WO2014/072433
PCT Pub. Date: May 15, 2014

(65) Prior Publication Data
US 2015/0285089 A1   Oct. 8, 2015

(30) Foreign Application Priority Data
Nov. 8, 2012  (IT) ................ FI2012A0245

(51) Int. Cl.
*F01D 15/10* (2006.01)
*F02C 3/04* (2006.01)
(Continued)

(52) U.S. Cl.
CPC .............. *F01D 15/10* (2013.01); *F01D 15/08* (2013.01); *F02C 3/04* (2013.01); *F02C 7/275* (2013.01);
(Continued)

(58) Field of Classification Search
CPC .... F01D 15/10; F02C 3/04; F02C 7/36; F01K 13/00; F01K 23/10
(Continued)

(56) References Cited

U.S. PATENT DOCUMENTS 5,689,141 A   11/1997  Kikkawa et al.
6,931,856 B2   8/2005  Belokon et al.
(Continued)

FOREIGN PATENT DOCUMENTS

EP   2241725 A2   10/2010
JP   3253704 A    11/1991
(Continued)

OTHER PUBLICATIONS

Italian Search Report dated Aug. 5, 2013 which was issued in connection with Italian Patent Application No. FI2012A000045 which was filed on Nov. 8, 2012.
(Continued)

*Primary Examiner* — Christopher Demeree
(74) *Attorney, Agent, or Firm* — GE Global Patent Operation

(57) ABSTRACT

A drive system for driving at least one compressor is described. The system comprises a gas turbine configured and arranged for driving the compressor. The gas turbine has a hot end and a cold end. A load coupling for connection of said gas turbine to the compressor is arranged at hot end of the gas turbine. An electric motor/generator arranged at the cold end of the gas turbine. The electric motor/generator is electrically connected to an electric power grid and is
(Continued)

adapted to function as a generator for converting excess mechanical power from the gas turbine into electrical power and delivering the electrical power to the electric power grid, and as a motor for supplementing driving power to the compressor.

17 Claims, 4 Drawing Sheets

(51) Int. Cl.
  *F01D 15/08* (2006.01)
  *F02C 7/275* (2006.01)
(52) U.S. Cl.
  CPC ...... *F05D 2220/76* (2013.01); *F05D 2250/31* (2013.01)
(58) Field of Classification Search
  USPC ...... 60/772, 39.182, 788, 805; 290/52, 36 R, 290/38 R; 123/179.28
  See application file for complete search history.

(56) References Cited

U.S. PATENT DOCUMENTS

| | | | |
|---|---|---|---|
| 7,683,497 B2* | 3/2010 | Gozdawa | F01D 15/10 290/4 R |
| 8,049,353 B1 | 11/2011 | Eng et al. | |
| 8,247,919 B2* | 8/2012 | Hoffmann | F01K 13/02 290/52 |
| 9,157,373 B2 | 10/2015 | Bei et al. | |
| 9,284,964 B2* | 3/2016 | Sites | F04D 25/04 |
| 2002/0077512 A1 | 6/2002 | Tendick et al. | |
| 2004/0070211 A1 | 4/2004 | Franchet et al. | |
| 2007/0132249 A1 | 6/2007 | Andrew et al. | |
| 2008/0014079 A1 | 1/2008 | Lockwood, Jr. | |
| 2009/0054191 A1 | 2/2009 | Holt et al. | |
| 2010/0213709 A1 | 8/2010 | Berendt et al. | |

FOREIGN PATENT DOCUMENTS

| | | | |
|---|---|---|---|
| JP | 4086307 A | 3/1992 | |
| JP | 8219571 A | 8/1996 | |
| JP | 2000186576 A | 7/2000 | |
| JP | 2001505974 A | 5/2001 | |
| JP | 2007505261 A | 3/2007 | |
| JP | 2011130657 A | 6/2011 | |
| JP | 2012057621 A | 3/2012 | |
| RU | 2321755 C2 | 4/2008 | |
| RU | 2010117378 A | 11/2011 | |
| WO | 9826159 A1 | 6/1998 | |
| WO | 2005047789 A2 | 5/2005 | |
| WO | 2012004516 A1 | 1/2012 | |

OTHER PUBLICATIONS

International Search Report dated Mar. 17, 2014 which was issued in connection with PCT Patent Application No. PCT/EP13/073308 which was filed on Nov. 7, 2013.
Unofficial English Translation of Chinese Office Action issued in connection with corresponding CN Application No. 201380058601.1 dated Jan. 26, 2016.
Kuznetsov S. A., Bol'shojTolkovyjSlovr' RusskogoJazyka (The Great Explanatory Russian Dictionary), Saint-Petersburg, "Norint", 2000, p. 779.
Ishlinaky A. U., NovyiPolitecknicheskyiSlovar (New PolytechnicalDictrionary) Moscow, "BolshayaRossijskayaEnciklopedia", 2003, p. 93.
JP Office Action issued in connection with corresponding JP Application No. 2015540182 dated Sep. 5, 2017.
Russian Office Action issued in connection with corresponding RU Application No. 2015116482 dated Sep. 28, 2017.

* cited by examiner

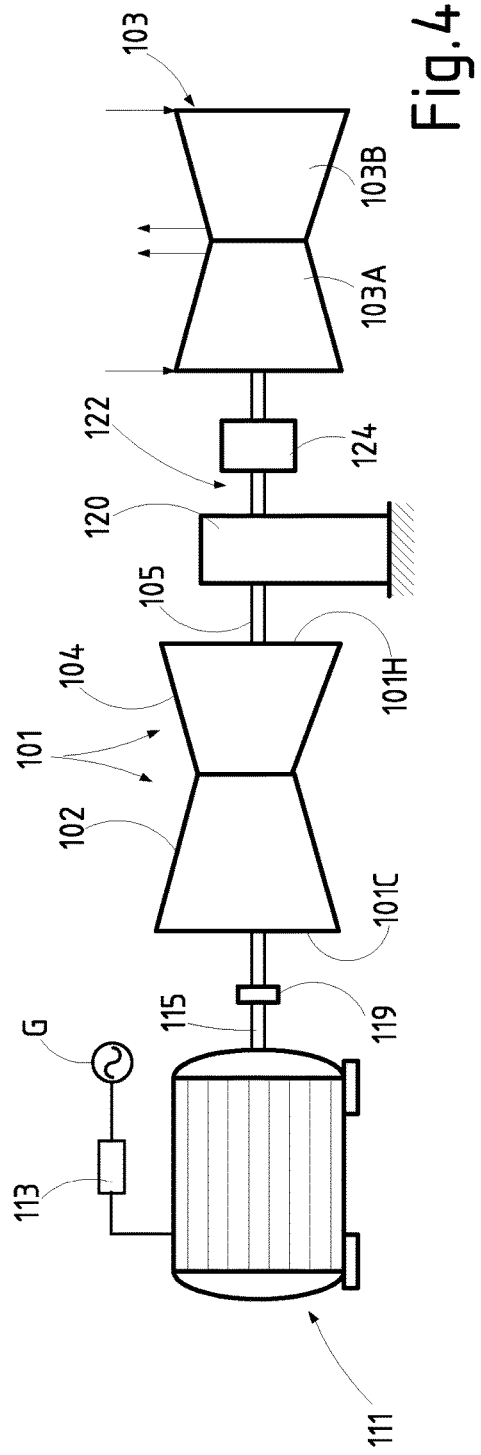
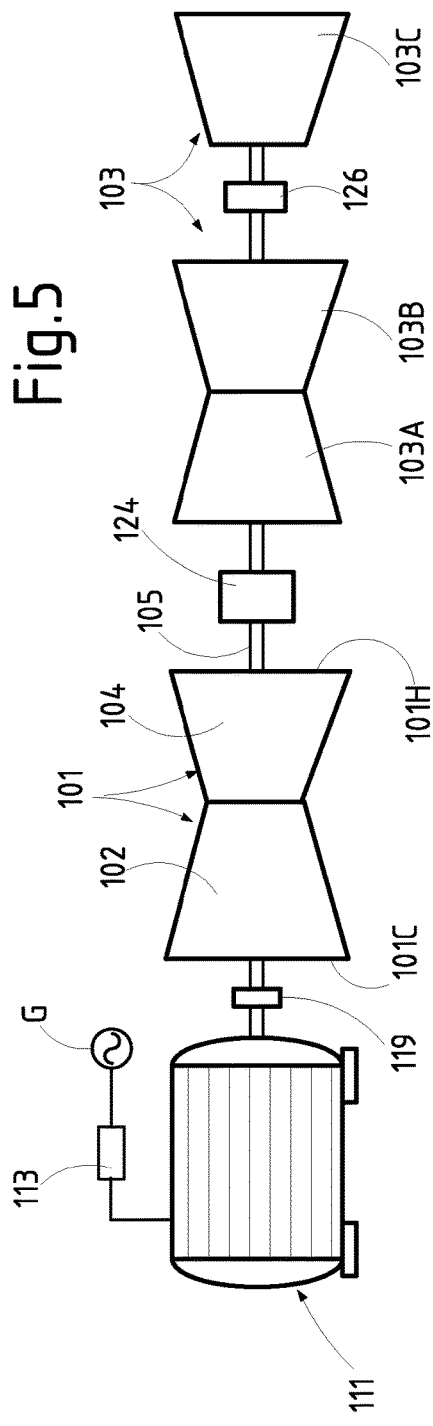

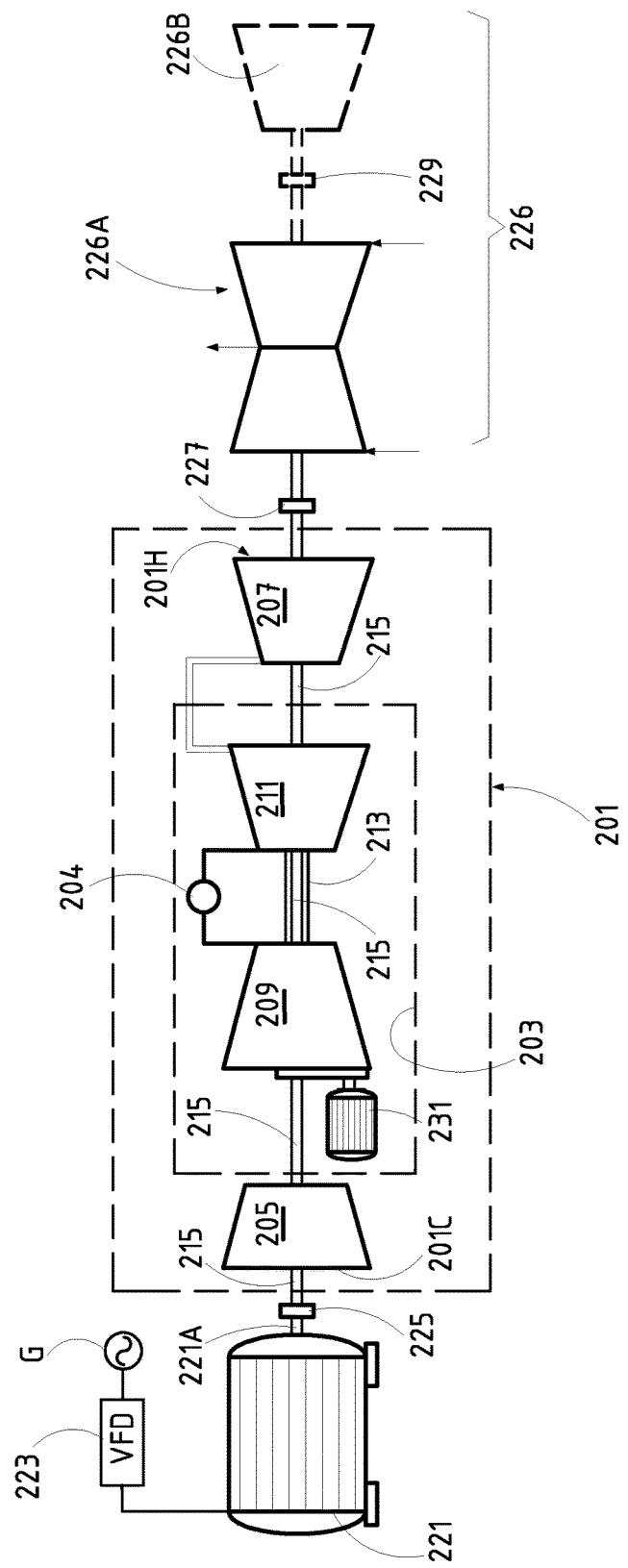

GAS TURBINE IN MECHANICAL DRIVE APPLICATIONS AND OPERATING METHODS

BACKGROUND

The present disclosure concerns improvements to gas turbine systems used in mechanical drive applications. In particular, but not exclusively the disclosure concerns gas turbine systems for driving compressors, e.g. compressors for refrigerant fluids in liquefied natural gas facilities.

The disclosure further concerns improvements in methods for operating a system comprising a gas turbine and a load, e.g. a compressor for LNG, or oil and gas applications.

Liquefied Natural Gas (LNG) results from a liquefaction process, in which the natural gas is cooled using one or more refrigeration cycles in a cascade arrangement, until it becomes liquid. Natural gas is often liquefied for storage or transportation purposes, e.g. if pipeline transportation is not possible or economically unfeasible.

Cooling of the natural gas is performed using closed or opened refrigeration cycles. A refrigerant is processed in a compressor or compressors, condensed and expanded. The expanded, chilled refrigerant is used to remove heat from the natural gas flowing in a heat exchanger.

Refrigerant compressors in LNG, pipeline applications or other applications in the oil and gas industry, are often driven by gas turbines. The gas turbine power availability (i.e. the power available on the turbine power shaft) is dependent upon ambient conditions, e.g. air temperature, and other factors, such as ageing. The turbine power availability increases with decreasing temperatures and, conversely, decreases with increasing temperatures. This causes power availability fluctuations both in the 24 hours as well as during the year, due to daily and seasonal temperature fluctuations.

It has been suggested to provide an electric motor in combination with a gas turbine to drive a load, comprised of e.g. one or more compressors. The electric motor is operated to supplement mechanical power to the compressor or compressors to maintain the overall mechanical power on the compressor shaft constant, when power availability of the turbine decreases and/or to increase the total mechanical power used to drive the load. This function of the electric motor is referred to as helper duty. The same electric motor is usually used also as a starter motor, to accelerate the string formed by the gas turbine and the compressor or compressors from zero to the rated speed.

When an excess mechanical power is generated by the turbine, e.g. if the ambient temperature drops below the design temperature and consequent increase in power availability of the turbine, the excessive mechanical power generated by the gas turbine is converted into electric energy, using the electric helper motor as a generator.

FIG. 1 illustrates a gas turbine and compressor arrangement with a helper/starter/generator machine, typically used in an LNG facility. The gas turbine 1 is connected via a common shaft line 3 to an electric motor/generator 5. The shaft line can be comprised of a plurality of shaft portions 3A, 3B, 3C, 3D. Reference number 4 designates a rigid coupling arranged between the gas turbine and the electric motor/generator 5. A further flexible coupling 6 is arranged between the electric motor/generator 5 and a load 7, e.g. a compressor. The electric motor/generator 5 has a drive-through capability, i.e. is designed to allow the mechanical power generated by the gas turbine 1 to be transmitted through the motor/generator 5 to the compressor 7. The drive-through capability must be equal to or greater than the gas turbine output power. The electric motor/generator 5 is connected to an electric power grid G through a frequency converter 11.

The electric motor/generator 5 is used as a starter to accelerate the gas turbine 1 from zero speed to full speed. Since the electric motor/generator 5 is located on the common shaft line 3, when performing the starter function, the motor/generator 5 also accelerates the entire compression string, i.e. the compressor or compressors 7. This requires the electric motor/generator 5 to be sufficiently powerful to accelerate the mass of all the rotational machines connected to the common shaft line 3, and also to overcome the aerodynamic load of the compressor or compressors 7, since during start-up the working fluid present in the compressor or compressors 7 starts flowing and the pressure thereof increases.

In other known natural gas liquefaction facilities the electric motor/generator is connected at one end of the compressor or compressors and the gas turbine is arranged at the opposite end of the compressors. The compressor or compressors is thus located between the gas turbine and the electric helper/generator. When the compressor is a vertically-split compressor, the electric motor/generator must be removed if the compressor requires maintenance. Moreover, in these known configurations, a dedicated starter for the gas turbine is provided on the cold end side of the gas turbine.

SUMMARY OF THE INVENTION

In one embodiment of the present disclosure, a drive system for driving a load is provided, comprising a gas turbine configured and arranged for driving the load and having a hot end and a cold end. The gas turbine is provided with a load coupling for connection of said gas turbine to the load, arranged at one of said hot end and cold end of the gas turbine. An electric motor/generator is further provided, arranged at the opposite end of the gas turbine. In some embodiments, the electric motor/generator is connected at the cold end of the gas turbine and the load is connected at the hot end of the gas turbine. Placing the electric motor/generator on the cold end of the gas turbine makes retrofitting of existing plants easier, exploiting the existing auxiliary base plate. Space on the base plate for the electric motor/generator can be obtained by removing the existing starter and torque converter and/or other auxiliary facilities. In other embodiments, e.g. when the gas turbine is a multi-shaft gas turbine, the load can be connected to the cold end of the gas turbine and the electric motor/generator can be connected to the hot end of the gas turbine. The specific positioning of the load and the electric motor/generator with respect to the hot and cold end of the gas turbine can also depend upon design constraints, since a more performing shaft/flanges design is required on the load side. In some configurations, the hot end shaft/flanges can be designed for transmitting higher power rates than the cold end coupling.

In some embodiments the load can comprise one or more compressors, such as compressor(s) of an LNG facility.

In some embodiments, the electric motor/generator is electrically connected to an electric power grid. The electric motor/generator is adapted to function as a generator for converting excess mechanical power from the gas turbine to electrical power and delivering the electrical power to the electric power grid, and as a motor for supplementing driving power to the compressor when the mechanical power generated by the gas turbine is reduced.

Arranging the electric motor/generator at the turbine end opposite the load has several advantages over the prior art configurations. In particular, with respect to configurations where the electric motor/generator is arranged at the end of the line, beyond the load, the configuration according to the subject matter disclosed herein results in improved accessibility to the load. In particular when the compressor has a vertical split casing, access to the compressor is facilitated, which results in easier maintenance. A separate starter at the cold end of the gas turbine for gas turbine solo-run during the commissioning phase can be dispensed with. In case of short circuit of the motor/generator, stress on the compressor is mitigated.

With respect to the configuration of FIG. 1, the novel configuration disclosed herein results in a simpler, smaller and less expensive electric machine/generator, not requiring drive-through capability.

In some embodiments, the gas turbine is a single-shaft gas turbine, wherein the electric motor/generator also operates as a starter motor for the string comprising the gas turbine and the load.

According to one further aspect, the disclosure concerns a method of starting a system comprising a gas turbine and a load, the method comprising: providing a gas turbine with a hot end and a cold end; coupling a load to one of said hot end and cold end;

coupling an electric motor/generator to the other one of said hot end and cold end; switching the electric motor/generator in a motor mode; electrically powering the electric motor/generator and converting electric power into mechanical power in the electric motor/generator and using the mechanical power for starting-up the gas turbine and the load, mechanical power being transferred from the electric motor/generator to the load through the gas turbine.

According to another aspect, the disclosure refers to method of operating a gas turbine system comprising a gas turbine and a load driven by the gas turbine, the method comprising: providing a gas turbine with a hot end and a cold end; coupling a load to one of said hot end and cold end; coupling an electric motor/generator to the other one of said hot end and cold end, and mechanically coupling the electric motor/generator to the load; generating mechanical power by means of the gas turbine; powering the load with the mechanical power generated by the gas turbine.

According to some embodiments, when the mechanical power generated by the gas turbine exceeds the mechanical power required to drive the load, the method provides for the following steps: operating the electric motor/generator in a generator mode; transferring excess mechanical power from the gas turbine to the electric motor/generator; and converting the excess mechanical power into electric power in the electric motor/generator.

According to some embodiments, when the mechanical power generated by the gas turbine is less than the power required to drive the load, the method provides for the following steps: operating the electric motor/generator in a motor mode; electrically powering the electric motor/generator; converting electric power into supplemental mechanical power in the electric motor/generator; transferring the supplemental mechanical power from the electric motor/generator through the gas turbine to the load; driving the load with combined power generated by the gas turbine and supplemental mechanical power generated by the electric motor/generator.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIGS. 2, 3, 4, 5, and 6 illustrate schematic diagrams of gas turbine and compressor arrangements according to two embodiments according to the present disclosure.

DETAILED DESCRIPTION OF EMBODIMENTS OF THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 1:
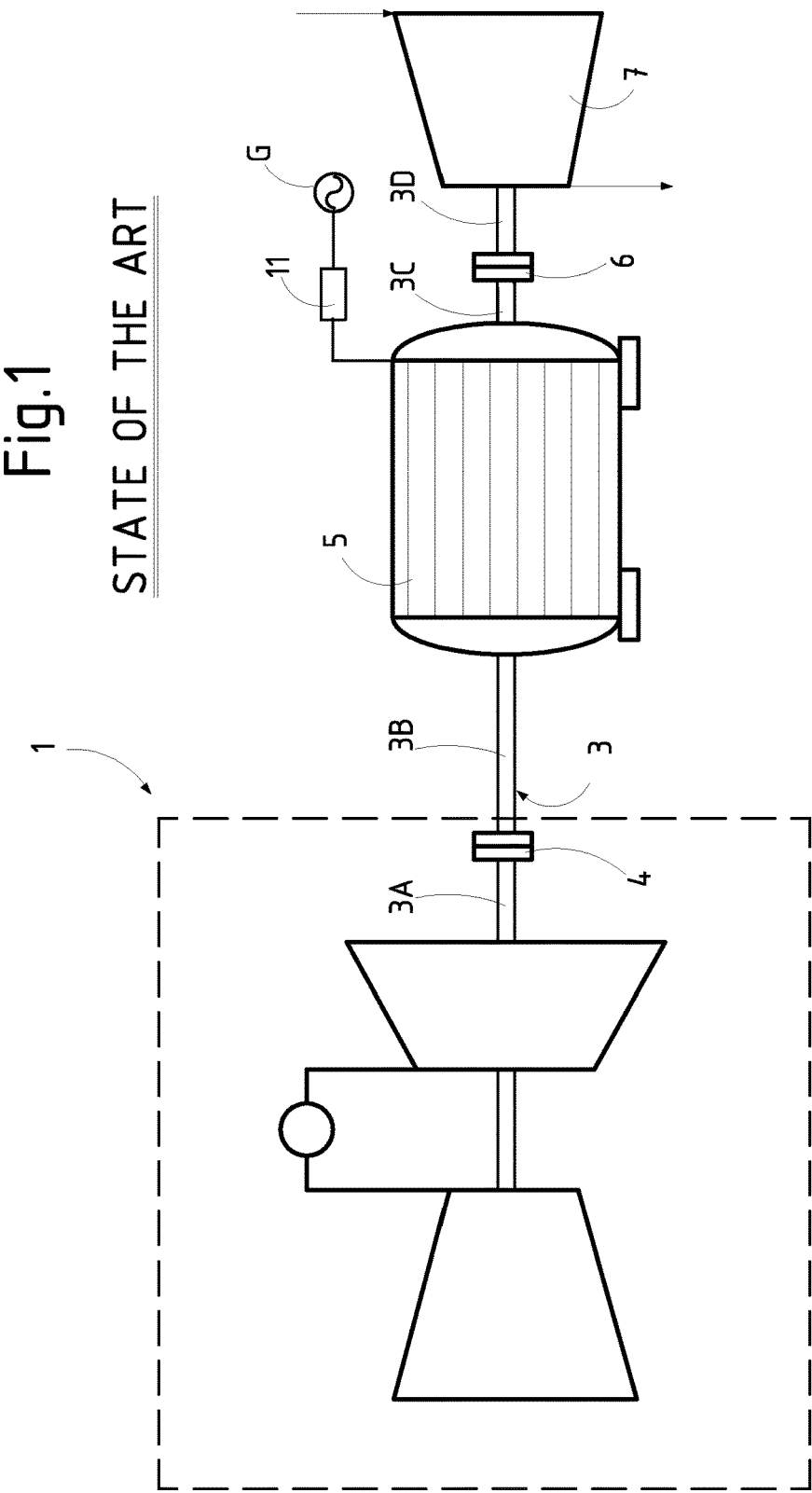
FIG. 1 illustrates a schematic diagram of a gas turbine and compressor according to the current art.
Figure 2:
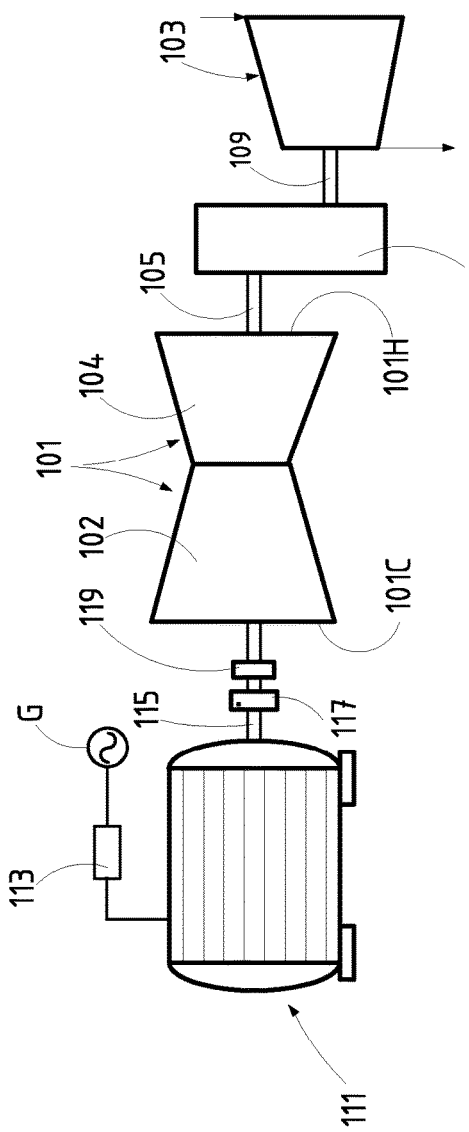

In the embodiment of FIG. 2 a gas turbine 101 is provided for driving a load 103.

The gas turbine 101 has a first end 101H and a second end 101C. The first end 101H is referred to as the hot end of the turbine, while the second end 101C is referred to as the cold end of the turbine. The hot end 101 H is usually the end where the exhaust combustion gases are discharged from the power turbine 104, while the cold end 101C is usually the end where the inlet of the compressor 102 of the gas turbine 101 is located.

In the embodiment of FIG. 2 the load 103 comprises a compressor, for example a centrifugal compressor, such as a refrigeration compressor of an LNG facility or a pipeline compressor or the like. In other embodiments the load can be comprised of more than just one compressor, i.e. a string of two or more compressors, rotating at the same rotational speed or at different rotational speeds, e.g. by interposing one or more speed manipulating devices, such as a gearbox, between consecutively arranged compressors of the string.

In the embodiment of FIG. 2 the load 103 is drivingly connected to the hot end 101H of the gas turbine 101 through a load coupling 105. If the load 103 requires a rotational speed different than the rated rotational speed of the gas turbine 101, a speed manipulating device 107 is arranged between the gas turbine 101 and the load 103. For example the speed manipulating device can be comprised of a gearbox. In other embodiments the speed manipulating device 107 can be comprised of a torque converter. Reference number 109 indicates a driven shaft connecting the speed manipulating device 107 to the load 103.

The end of the gas turbine 101 opposite the load coupling 105, i.e. the cold end 101C, is connected to a reversible electric machine 111. The reversible electric machine 111 is a motor/generator, i.e. a machine capable of converting mechanical power available on the shaft thereof into electric power available on the electric terminals of the machine, or vice-versa converting electric power available at the electric terminals thereof into mechanical power on the machine shaft. The electric motor/generator 111 is electrically connected to an electric power grid G.

A frequency converter or variable frequency driver 113 can be provided between the electric terminals of the electric motor/generator 111 and the electric power grid G. The frequency converter 113 allows electric energy at grid frequency, e.g. 50 Hz or 60 Hz to be used to rotate the electric motor/generator 111 at any speed as required, depending upon the function performed by the electric motor/generator 111, by modifying the frequency to match the frequency of rotation of the electric motor/generator 111. Vice-versa, the frequency converter 113 is also capable of converting the frequency of electric power generated by the electric motor/generator 111 to the grid frequency. The frequency converter 113 thus enables the system to rotate at a variable rotary speed, depending upon requirements.

The electric motor/generator 111 is mechanically connected to the cold end 101C of the gas turbine 101 by means of a motor output shaft 115. In some embodiments a mechanical fuse 119 can be arranged between the motor output shaft 115 and the gas turbine 101. A mechanical fuse is a device capable of breaking down in case of overload on the device. In the embodiments described herein, the mechanical fuse protects for example the turbomachines 101 and 103 in case of short circuit on the electric motor/generator 111.

In other embodiments, between the motor output shaft 115 and the gas turbine 101 a clutch 117 can be arranged, for selectively connecting and disconnecting the electric motor/generator 111 to and from the gas turbine 101. In some embodiments a gear box or another speed manipulation device can be arranged between the electric motor/generator 111 and the gas turbine.

In some embodiments, as shown in FIG. 2, a mechanical fuse and a clutch can be used in combination.

In some embodiments, the gas turbine 101 can be a heavy duty gas turbine. In other embodiments the gas turbine 101 can be an aeroderivative gas turbine. A combination of two or more gas turbines to drive the same compressor or compressors can also be provided.

In some embodiments the gas turbine 101 is a single-shaft gas turbine. The single-shaft gas turbine comprises a compressor rotor and a turbine rotor mounted on a common rotating shaft. One end of the shaft is mechanically linked to the electric motor/generator 111 and the opposite end of the shaft is mechanically linked to the load 103 through the load coupling 105. The electric motor/generator 111 is therefore connected to a single shaft line and drives into rotation the compressor and the power turbine of the gas turbine, as well as the compressor or compressors forming the load 103.

In the single-shaft gas turbine configuration the electric motor/generator 111 can perform a starter function, a helper function and a generator function as will now be described. Mechanical power available on the electric motor/generator 111 is mechanically transmitted to the load via the common shaft line. Excess mechanical power available on the power turbine shaft is directly transmitted to the electric motor/generator 111 and converted into electric power.

In a single-shaft gas turbine 101, when the gas turbine 101 and the load 103 are at rest, starting of the line is operated by the electric motor/generator 111 functioning as a starter. The electric motor/generator 111 is switched in the motor-mode. Electric power from the electric power grid G is delivered to the electric motor/generator 111 via the frequency converter 113. The frequency of the electric power delivered to the electric motor/generator is controlled to accelerate the electric motor/generator 111 from zero to a required rotational speed, which can be the rated speed of the gas turbine 101, or else a lower speed.

Mechanical power generated by the electric motor/generator 111 rotates the shaft of the gas turbine 101 and the load coupling 105, as well as the compressor or compressors 103. The electric generator/motor 111 is thus designed to provide sufficient power to accelerate the gas turbine and the compressor or compressors forming the load 103 at start-up. This requires overcoming the inertia of the turbomachines as well as the aerodynamic load of the compressor or compressors 103. The aerodynamic load is the load generated by the fluid processed by the compressor or compressors forming the load 103. The aerodynamic load increases as the rotational speed of the compressor increases, due to the increased pressure of the fluid processed by the compressor. The electric motor/generator 111 is therefore designed to provide a power sufficient to overcome the inertial and aerodynamic loads of the turbomachines driven by the electric motor/generator 111 at least at the rotational speed required to ignite the gas turbine.

Once the gas turbine 101 takes over the task of driving the load, the electric motor/generator can be de-energized. In some embodiments, the electric motor/generator can continue operating in the motor mode to provide additional mechanical power which is used in combination with the mechanical power generated by the gas turbine to drive the load.

In some embodiments, the gas turbine 101 is operated at a fixed rotational speed and full load, to maximize the gas turbine efficiency. If the mechanical power generated by the gas turbine 101 exceeds the power required to drive the load 103, e.g. due to decreased ambient temperature and consequent increased power availability of the turbine, the electric motor/generator 111 is switched in the generator mode and converts the excess mechanical power available on the turbine shaft into electric energy. The electric power generated by the electric motor/generator 111 is delivered to the electric power grid G. The frequency of the electric power can be converted by the frequency converter 113 if required.

If the mechanical power generated by the gas turbine 101 is insufficient to drive the load, e.g. due to increased ambient temperature and consequent drop in power availability of the turbine, the electric motor/generator 111 is switched to the motor-mode and operates as a helper. Electric power from the electric power grid G is converted by the electric motor/generator 111 into mechanical power on the motor output shaft 115. In some embodiments, as noted above, the electric motor/generator can be operated continuously in the motor mode rather than only in case of drop in the gas turbine power availability. In both instances, the total mechanical power available on the load coupling 105 will be the sum of the mechanical power generated by the gas turbine 101 and the mechanical power generated by the electric motor/generator 111.

The electric motor/generator 111 does not require a drive-through capability, being arranged at the cold end of the gas turbine 101 and the shaft thereof does not require to be designed to support the rated power of the gas turbine 101 at full load.

Figure 3:
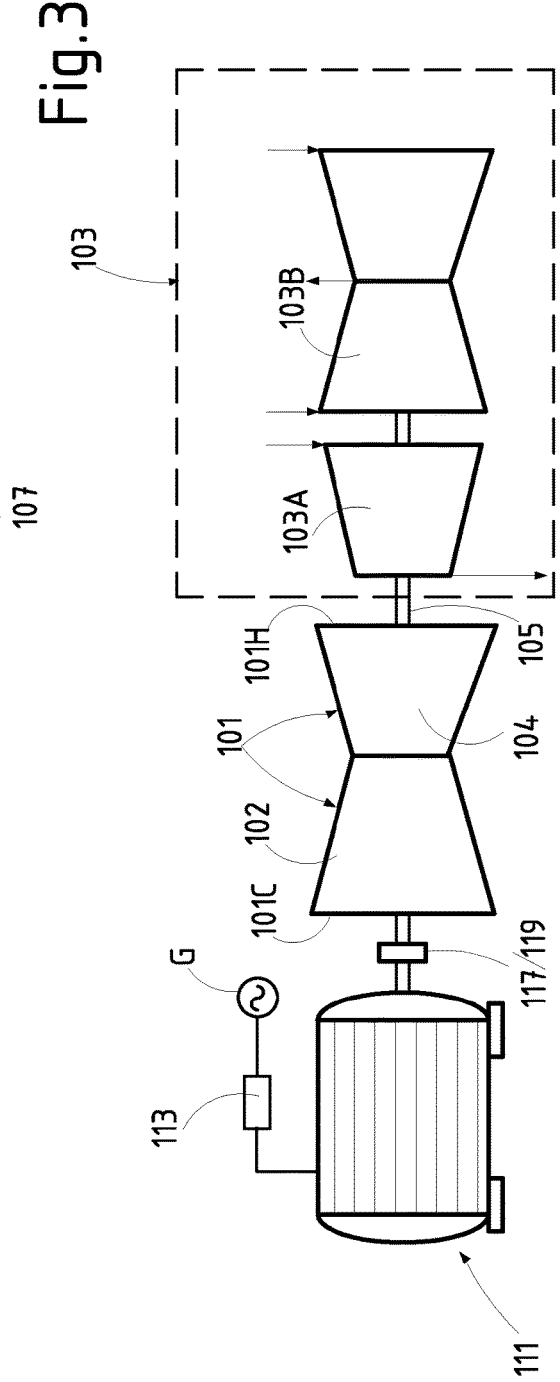

FIG. 3 illustrates a further embodiment of a turbine-driven compressor arrangement. e.g. for processing a refrigerant fluid in an LNG facility. The same reference numbers are used to designate the same or equivalent components as in FIG. 2. In the embodiment of FIG. 3 the load 103 is comprised of a compressor arrangement, including a first compressor 103A and a second compressor 103B. In the exemplary embodiment of FIG. 3 the compressors are directly driven by the gas turbine 101 with no speed manipulating device there between. In other embodiments a speed manipulating device, e.g. a gearbox, can be provided between the gas turbine 101 and the compressor 103A and/or between the compressor 103A and the compressor 103B.

The facility of FIG. 3 operates substantially in the same manner as the one of FIG. 2.

In both embodiments shown in FIGS. 2 and 3 the electric motor/generator 111 does not require drive-through capability, as it is located at one end of the string. The location of the electric motor/generator 111, moreover, allows intervention on the last compressor even if the latter is a vertically split compressor, thus facilitating maintenance thereof. The location of the electric motor/generator 111 further mitigates the mechanical stresses on the driven compressor shaft line in case of short circuit of the electric motor/generator 111, with respect to the state-of-the-art configurations, where the electric motor/generator 111 is connected directly to the driven shaft line.

FIG. 4 illustrates a further embodiment of a system comprising a gas turbine 101 and a load 103 driven thereby, according to the present disclosure. The same reference numbers indicate the same or corresponding components, elements or parts as in the previous embodiments and will not be described in detail again. The motor/generator 111 is connected at the cold end 101C of the gas turbine 101 while the load 103 is connected at the hot end 101H of the gas turbine 101. In the exemplary embodiment of FIG. 4 the load 103 comprises a first compressor 103A and a second compressor 103B. The load coupling 105 is supported by an intermediate bearing arrangement 120. A flexible coupling 122 can be provided between the bearing arrangement 120 and the compressor shaft. In the embodiment of FIG. 4 the load is therefore driven by the gas turbine 101 via a partially rigid and partially flexible coupling. A flexible coupling as intended herein is a coupling including a flexible or elastic element, schematically shown at 124, such as a flexible or elastic joint. A rigid coupling is, conversely, a coupling which does not contain a flexible or elastic element.

Flexible couplings offset thermal expansion of the shafts connecting the turbomachinery as well as possible angular misalignment, reducing loads on the bearings and machine vibrations.

Arranging a flexible coupling between the gas turbine and the load leads to improved functionality and efficiency of the dry gas seals of the compressor(s) driven by the gas turbine and simplifies the alignment between the turbomachines, as well as the rotodynamic design.

FIG. 5 illustrates a further embodiment of the subject matter disclosed herein. The same or equivalent components, elements or parts as in FIG. 4 are provided with the same reference numbers and will not be described in detail again. The embodiment of FIG. 5 differs from the embodiment of FIG. 4 inasmuch the former comprises a load coupling 105, which only includes a flexible coupling directly connecting the gas turbine 101 and the load 103. Reference number 124 indicates a flexible or elastic element of the flexible coupling 105.

In some embodiments the load 103 can comprise two or more compressors connected to one another by means of an intermediate flexible coupling. FIG. 5 shows an exemplary embodiment of a third compressor 103C connected to the first and second compressors 103A, 103B via a flexible coupling 126.

In FIGS. 2 to 5 a single-shaft gas turbine 101 is illustrated. Suitable gas turbines which can be used in the above described arrangements are MS9001, MS7001, MS6001, MS5001, GE10-1 heavy duty, single shaft gas turbines all available from GE Oil & Gas.

In other embodiments the gas turbine can be a multi-shaft gas turbine having two or more concentrically arranged shafts. FIG. 6 schematically illustrates a dual-shaft gas turbine, designated 201 as a whole. A suitable dual-shaft gas turbine is the LM6000® gas turbine available from General Electric, Evendale, Ohio, USA. The dual-shaft gas turbine 101 comprises a core 203, a low-pressure compressor 205 and a power or low-pressure turbine 207. The core 203 comprises, in turn a high-pressure compressor 209 and a high-pressure turbine 211. The rotor of the high-pressure compressor 209 and the rotor of the high-pressure turbine 211 are mounted on a common core shaft or outer shaft 213. The rotor of the low-pressure compressor 205 and the rotor of the low-pressure turbine or power turbine 207 are mounted on an inner or power shaft 215. The inner shaft 215 extends coaxially to and through the outer shaft 213. The hot end and the cold end of the gas turbine 201 are schematically shown at 201H and 201C, respectively. An electric motor/generator 221 is mechanically connected to the inner shaft 215 at the cold end 201C of the gas turbine 201 and electrically connected to an electric power grid G via a frequency converter or a variable frequency driver 223. A clutch and/or a mechanical fuse and/or a gearbox, generically shown at 225, can be arranged between cold end side of the inner shaft 215 and the shaft 221A of the electric motor/generator 221.

The hot end side of the inner shaft 215 can be mechanically coupled to a load 226. A flexible coupling can be used for that purpose. Reference number 227 schematically indicates a flexible element of the flexible coupling. A gearbox or any other speed manipulation device can be arranged between the hot end 201H of the gas turbine 201 and the load 226 and/or between consecutively arranged driven machines of the load 226.

In the exemplary embodiment of FIG. 6 the load 226 is comprised of a first compressor 226A and an optional second compressor 226B. A flexible coupling schematically shown at 229 can be provided between the two compressors 226A, 226B.

In some embodiments, a starter 231 is provided for starting the core 203 of the gas turbine 201.

Ambient air is delivered to the low-pressure compressor 205 and compressed at a first pressure. The partly compressed air enters the high-pressure compressor 209 of the core 203 and is compressed to a high pressure. The pressurized air is delivered to a combustor 204 and mixed with a fuel, e.g. a gaseous or liquid fuel. The air-fuel mixture is ignited and the combustion gases are sequentially expanded in the high pressure turbine 211 and in the low-pressure or power turbine 207. Mechanical power generated by the high-pressure turbine 211 is used to drive the high-pressure compressor 209 of the turbine core 203, while the mechanical power generated by the low pressure or power turbine 211 is available on the inner shaft 215 and is used to drive the load 226.

Excess mechanical power available from the power turbine 207 on the inner shaft 215 can be transferred to the electric motor/generator 211 and converted thereby in electric power, the electric motor/generator 211 operating in the generator mode. The electric power is conditioned by the frequency converter 223 and made available on the electric power grid G. If mechanical power generated by the power turbine 207 is insufficient to drive the load 226, e.g. due to drop of the turbine power availability caused by an increase in the ambient temperature, the electric motor/generator 221 can be switched in the motor mode and converts electric power from the electric power grid G into mechanical power, made available on the inner shaft 215 to be combined with the mechanical power generated by the power turbine 207 to drive the load 226.

In this embodiment the starter duty is not provided by the electric motor/generator 221, but rather by a starter motor 231 provided on the core 203. When the gas turbine 201 must be started, the starter motor 231 drives the outer shaft 213 into rotation, so that the core 203 can start. Once the high-pressure turbine 211 has been ignited, combustion gases generated thereby are delivered to the power turbine 207 to start the low-pressure sections of the gas turbine 201, i.e. the low-pressure compressor 205 and the low-pressure gas turbine 207.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. A drive system for driving a load, the drive system comprising:
    a compressor, wherein the load comprises the compressor;
    a gas turbine configured and arranged for driving the compressor, the gas turbine having a hot end and a cold end;
    a load coupling connecting the gas turbine to the compressor, arranged at one of the hot end and the cold end of the gas turbine; and
    an electric motor/generator arranged at the other one of the hot end and the cold end of the gas turbine, the electric motor/generator electrically connected to an electric power grid and mechanically connected to the load coupling;
    wherein the electric motor/generator is configured to function as a generator for converting excess mechanical power from the gas turbine into electrical power and delivering the electrical power to the electric power grid, and as a motor for supplementing driving power to the compressor.

2. The drive system of claim 1, wherein the electric motor/generator is arranged at the cold end of the gas turbine and the load coupling is arranged at the hot end of the gas turbine.

3. The drive system of claim 1, further comprising a mechanical fuse between the electric motor/generator and the gas turbine.

4. The drive system of claim 1, further comprising a clutch between the electric motor/generator and the gas turbine.

5. The drive system of claim 1, wherein the electric motor/generator is permanently connected to the cold end or the hot end of the gas turbine.

6. The drive system of claim 1, wherein the electric motor/generator is further configured to function as a starter to start up the gas turbine and the load.

7. The drive system of claim 1, wherein the gas turbine is a single-shaft gas turbine.

8. The drive system of claim 1, wherein the gas turbine is a dual-shaft gas turbine and comprises:
    a core comprised of a high-pressure compressor and a high-pressure turbine connected by a first shaft;
    a starter for starting the core;
    a low-pressure compressor; and
    a low-pressure turbine,
    wherein the low-pressure turbine and the low-pressure compressor are connected by a second shaft extending from the hot end to the cold end of the gas turbine, and
    wherein load is mechanically connected to the second shaft at one of the hot end and the cold end of the gas turbine and the electric motor/generator is mechanically connected at the second shaft at the other one of the hot end and the cold end of the gas turbine.

9. The drive system of claim 1, further comprising a frequency converter connected between the electric motor/generator and the electric power grid, the frequency converter configured and controlled for conditioning the electric frequency from the electric power grid to the electric motor/generator and from the electric motor/generator to the electric power grid.

10. The drive system of claim 1, wherein the electric motor/generator is arranged at the cold end of the gas turbine and the load coupling is arranged at the hot end of the gas turbine.

11. The drive system of claim 10, further comprising a mechanical fuse between the electric motor/generator and the gas turbine.

12. The drive system of claim 11, further comprising a clutch between the electric motor/generator and the gas turbine.

13. A method of starting a system comprised of a gas turbine and a load, the method comprising:
    providing the gas turbine with a hot end and a cold end;
    coupling a load to one of the hot end and the cold end;
    coupling an electric motor/generator to the other one of the hot end and the cold end;
    switching the electric motor/generator in a motor mode; and
    electrically powering the electric motor/generator and converting electric power into mechanical power in the electric motor/generator and using the mechanical power for starting-up the gas turbine and the load, the mechanical power transferred from the electric motor/generator to the load through the gas turbine,
    wherein the load comprises a compressor.

14. The method of claim 13, further comprising:
    coupling the electric motor/generator to the cold end of the gas turbine; and
    coupling the load to the hot end of the gas turbine.

15. A method of operating a gas turbine system comprised of a gas turbine and a load driven by the gas turbine, the method comprising:
    providing the gas turbine with a hot end and a cold end;
    coupling a load to one of the hot end and the cold end;
    coupling an electric motor/generator to the other one of the hot end and the cold end, and mechanically coupling the electric motor/generator to the load;
    generating mechanical power by the gas turbine;
    powering the load with the mechanical power generated by the gas turbine; and
    when the mechanical power generated by the gas turbine exceeds the mechanical power required to drive the load:
        operating the electric motor/generator in a generator mode;
        transferring excess mechanical power from the gas turbine to the electric motor/generator; and
        converting the excess mechanical power into electric power in the electric motor/generator,
    wherein the load comprises a compressor.

16. The method of claim 15, wherein:
    when the mechanical power generated by the gas turbine is less than the power required to drive the load, the method further comprising:
    operating the electric motor/generator in a motor mode;
    electrically powering the electric motor/generator;
    converting electric power into supplemental mechanical power in the electric motor/generator;
    transferring the supplemental mechanical power from the electric motor/generator through the gas turbine to the load; and
    driving the load with combined power generated by the gas turbine and supplemental mechanical power generated by the electric motor/generator.

17. The method of claim 15, further comprising:
    coupling the electric motor/generator to the cold end of the gas turbine; and
    coupling the load to the hot end of the gas turbine.

* * * * *